US012711551B2

(12) United States Patent
Coyne et al.

(10) Patent No.: US 12,711,551 B2
(45) Date of Patent: Aug. 18, 2026

(54) SYSTEM FOR MULTIPLATFORM INTEGRATION USER INTERFACES

(71) Applicant: Wells Fargo Bank, N.A., San Francisco, CA (US)

(72) Inventors: Joseph V. Coyne, Charlotte, NC (US); Hilani Kerr, Darien, CT (US); Jennel Ann McDonald, Oakland, CA (US); Madhumati Narasimhan, Pleasanton, CA (US); Pablo S. Simone, New York, NY (US); Ashish Dilip Tengshe, San Ramon, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 280 days.

(21) Appl. No.: 18/300,942

(22) Filed: Apr. 14, 2023

(65) Prior Publication Data

US 2023/0334577 A1 Oct. 19, 2023

Related U.S. Application Data

(60) Provisional application No. 63/363,082, filed on Apr. 15, 2022.

(51) Int. Cl.
*G06Q 40/06* (2012.01)
*G06F 9/451* (2018.01)
*H04L 9/40* (2022.01)

(52) U.S. Cl.
CPC ............. *G06Q 40/06* (2013.01); *G06F 9/451* (2018.02); *H04L 63/083* (2013.01)

(58) Field of Classification Search
CPC ....... G06Q 40/06; G06Q 9/451; H04L 63/083
See application file for complete search history.

(56) References Cited

U.S. PATENT DOCUMENTS 11,645,375 B2 * 5/2023 Yu ......................... G06F 21/335 713/185
11,995,174 B2 * 5/2024 Olden ................... G06F 21/604
2013/0132854 A1 * 5/2013 Raleigh ................. G06F 3/0482 715/738
2014/0258123 A1 * 9/2014 Fernandes .......... G06Q 20/4015 705/44
2019/0287170 A1 * 9/2019 Louie ..................... G06Q 40/02
2020/0106764 A1 * 4/2020 Hockey ................. H04L 9/3228
2021/0042738 A1 * 2/2021 Edwards ................ G06Q 20/38

OTHER PUBLICATIONS

Srivathsan et al., Ip.com, (Year: 2021).*

* cited by examiner

*Primary Examiner* — Scott S Trotter
(74) *Attorney, Agent, or Firm* — SCHWEGMAN LUNDBERG & WOESSNER, P.A.

(57) ABSTRACT

A method may include maintaining a user account of a user associated with a first service; presenting a user interface on a client device identifying a set of selectable services external to the server device; receiving a selection of a second service external to the server device; requesting login credentials of the a user account at the second service; transmitting an account access authorization request using the login credentials, requesting the user account of the user associated with the first service be given read and write permission to the user account at the second service; and in response to the request, receiving an authentication token from the second service granting read and write access to the user account associated with the second service via an interface presented by the first service.

9 Claims, 10 Drawing Sheets

SYSTEM FOR MULTIPLATFORM INTEGRATION USER INTERFACES

CLAIM OF PRIORITY

This patent application claims the benefit of U.S. Provisional Patent Application No. 63/363,082, titled "MULTI-PLATFORM INTEGRATION USER INTERFACES." filed Apr. 15, 2022, which is herein incorporated by reference in its entirety.

BACKGROUND

Mobile apps and web-based applications allow a user to view information related to various aspects of a service. For example, a music application may allow a user to see the user's favorite musicians, or a financial application may allow for viewing an overview of the user's finances.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1:
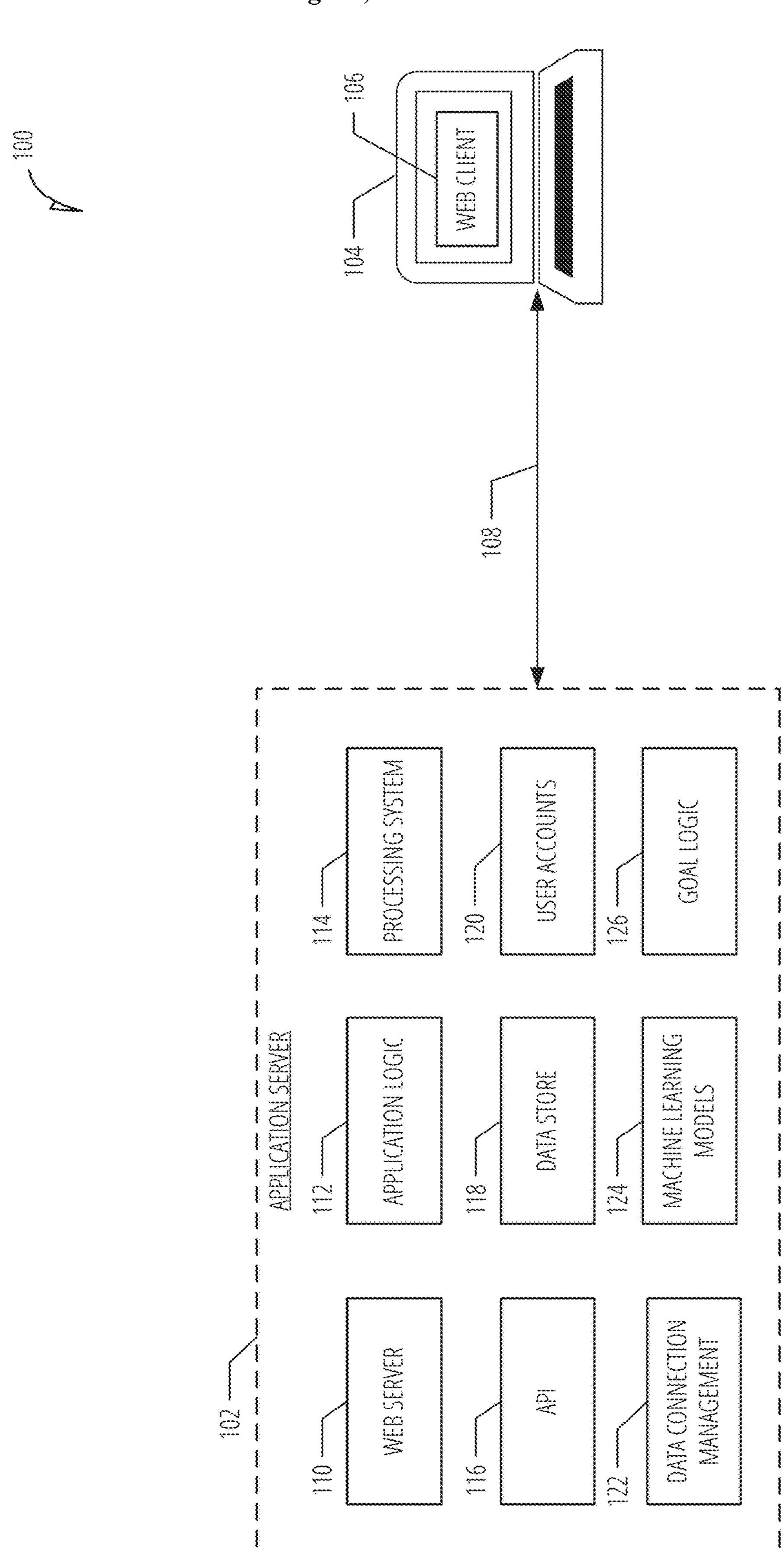
FIG. 1 is an illustration of components of a client device and an application server, according to various examples.

There are many online services that a user needs to interact with to manage aspects of their life. For example, the user may have multiple financial accounts, health savings accounts, insurance documents, etc. Traditionally, managing all of these services may be done in a few ways. The most common method is to login to each service individually as needs arise. Another method may be to use an aggregation service. Aggregation services generally allow limited read access to a number of different accounts.

However, these systems generally do not interface with more than one type of the services listed above. For example, a financial services aggregator may allow user to view their checking and savings accounts across multiple services alongside a retirement account. They do not, however, allow management of those services, or incorporation of other types of accounts such as health insurance documents or accounts.

As described in more detail below, the systems and methods of this disclosure alleviate many of the problems listed above. For example, a user may not only have read access to a number of different external accounts, but also management of those accounts—including creation of the accounts—all within a single application or website. Furthermore, a user may be able to obtain a view of their finances on external sites, and act on their finances within the external service. Accordingly, a user may not need to switch back and forth between their bank website and a home buying search website when researching and applying for a loan to purchase a home.

In the following description, for purposes of explanation, numerous specific details are set forth in order to provide a thorough understanding of some example embodiments. It will be evident, however, to one skilled in the art that the present invention may be practiced without these specific details.

Throughout this disclosure, electronic actions may be taken by components in response to different variable values (e.g., thresholds, user preferences, etc.). As a matter of convenience, this disclosure does not always detail where the variables are stored or how they are retrieved. In such instances, it may be assumed that the variables are stored on a storage device (e.g., RAM, cache, hard drive) accessible by the component via an API or other program communication method. Similarly, the variables may be assumed to have default values should a specific value not be described. User interfaces may be provided for an end-user or administrator to edit the variable values in some instances.

In various examples described herein, user interfaces are described as being presented to a computing device. Presentation may include transmitting data (e.g., a hypertext markup language file) from a first device (such as a web server) to the computing device for rendering on a display device of the computing device via a rendering engine such as a web browser. Presenting may separately (or in addition to the previous data transmission) include an application (e.g., a stand-alone application) on the computing device generating and rendering the user interface on a display device of the computing device without receiving data from a server.

Furthermore, the user interfaces are often described as having different portions or elements. Although in some examples these portions may be displayed on a screen at the same time, in other examples the portions/elements may be displayed on separate screens such that not all of the portions/elements are displayed simultaneously. Unless indicated as such, the use of "presenting a user interface" does not infer either one of these display options.

Additionally, the elements and portions are sometimes described as being configured for a certain purpose. For example, an input element may be described as being configured to receive an input string. In this context, "configured to" may mean presentation of a user interface element that is capable of receiving user input. Thus, the input element may be an empty text box or a drop-down menu, among others. "Configured to" may additionally mean computer executable code processes interactions with the element/portion based on an event handler. Thus, a "search" button element may be configured to pass text received in the input element to a search routine that formats and executes a structured query language (SQL) query with respect to a database.

FIG. 1 is an illustration 100 of components of a client device 104 and an application server 102, according to various examples. Application server 102 includes web server 110, application logic 112, processing system 114, application programming interface (API) 116, data store 118, user accounts 120, data connection management 122, machine learning models 124, and goal logic 126.

Application server 102 is illustrated as set of separate elements (e.g., components, logic, etc.). However, the functionality of multiple, individual elements may be performed by a single element. An element may represent computer program code that is executable by processing system 114. The program code may be stored on a storage device (e.g., data store 118) and loaded into a memory of the processing system 114 for execution. Portions of the program code may be executed in a parallel across multiple processing units (e.g., a core of a general-purpose computer processor, a graphical processing unit, an application specific integrated circuit, etc.) of processing system 114. Execution of the code may be performed on a single device or distributed across multiple devices. In some examples, the program code may be executed on a cloud platform (e.g., MICROSOFT AZURE® and AMAZON EC2®) using shared computing infrastructure.

Client device 104 may be a computing device which may be, but is not limited to, a smartphone, tablet, laptop, multi-processor system, microprocessor-based or programmable consumer electronics, game console, set-top box, or other device that a user utilizes to communicate over a network. In various examples, a computing device includes a display module (not shown) to display information (e.g., in the form of specially configured user interfaces). In some embodiments, computing devices may comprise one or more of a touch screen, camera, keyboard, microphone, or Global Positioning System (GPS) device.

Client device 104 and Application server 102 may communicate via a network (not shown). The network may include local-area networks (LAN), wide-area networks (WAN), wireless networks (e.g., 902.11 or cellular network), the Public Switched Telephone Network (PSTN) Network, ad hoc networks, cellular, personal area networks or peer-to-peer (e.g., Bluetooth®, Wi-Fi Direct), or other combinations or permutations of network protocols and network types. The network may include a single Local Area Network (LAN) or Wide-Area Network (WAN), or combinations of LAN's or WAN's, such as the Internet. Client device 104 and application server 102 may communicate data 108 over the network. Data 108 may include requests to connect two financial services accounts, user interfaces for managing multiple accounts services, etc.

In some examples, the communication may occur using an application programming interface (API) such as API 116. An API provides a method for computing processes to exchange data. A web-based API (e.g., API 116) may permit communications between two or more computing devices such as a client and a server. The API may define a set of HTTP calls according to Representational State Transfer (RESTful) practices. For examples, A RESTful API may define various GET, PUT, POST, DELETE methods to create, replace, update, and delete data stored in a database (e.g., data store 118).

Additionally, application server 102 may use APIs of other services to retrieve data on behalf of the user. For example, an API of an insurance company may be used to retrieve coverage limits for an automobile policy of the user for presentation within a web application provided by application server 102. Or an API of application server 102 may allow for checking, with an authorization token, if a displayed property is within the pre-approved limit of a user.

Application server 102 may include web server 110 to enable data exchanges with client device 104 via web client 106. Although generally discussed in the context of delivering webpages via the Hypertext Transfer Protocol (HTTP), other network protocols may be utilized by web server 110 (e.g., File Transfer Protocol, Telnet, Secure Shell, etc.). A user may enter in a uniform resource identifier (URI) into web client 106 (e.g., the INTERNET EXPLORER® web browser by Microsoft Corporation or SAFARI® web browser by Apple Inc.) that corresponds to the logical location (e.g., an Internet Protocol address) of web server 110. In response, web server 110 may transmit a web page that is rendered on a display device of a client device (e.g., a mobile phone, desktop computer, etc.).

Additionally, web server 110 may enable a user to interact with one or more web applications provided in a transmitted web page. A web application may provide user interface (UI) components that are rendered on a display device of client device 104. The user may interact (e.g., select, move, enter text into) with the UI components, and, based on the interaction, the web application may update one or more portions of the web page. A web application may be executed in whole, or in part, locally on client device 104. The web application may populate the UI components with data from external sources or internal sources (e.g., data store 118) in various examples.

In various examples, the web application is a dynamic user interface that enables a user to manage multiple accounts of the user that are spread across multiple external websites in a single application.

The web application may be executed according to application logic 112. Application logic 112 may use the various elements of application server 102 to implement the web application. For example, application logic 112 may issue API calls to retrieve or store data from data store 118 and transmit it for display on client device 104. Similarly, data entered by a user into a UI component may be transmitted using APIs 116 back to the web server 110. Application logic 112 may use other elements (e.g., user accounts 120, data connection management 122, machine learning models 124, and goal logic 126) of application server 102 to perform functionality associated with the web application as described further herein.

Data store 118 may store data that is used by application server 102. Data store 118 is depicted as singular element, but may in actuality be multiple data stores. The specific storage layout and model used in by data store 118 may take a number of forms—indeed, a data store 118 may utilize multiple models. Data store 118 may be, but is not limited to, a relational database (e.g., SQL), non-relational database (NoSQL) a flat file database, object model, document details model, graph database, shared ledger (e.g., blockchain), or a file system hierarchy. Data store 118 may store data on one or more storage devices (e.g., a hard disk, random access memory (RAM), etc.). The storage devices may be in standalone arrays, part of one or more servers, and may be located in one or more geographic areas.

User accounts 120 may include user profiles on users of application server 102. A user profile may include credential information such as a username and hash of a password. A user may enter in their username and plaintext password to a login page of application server 102 to view their user profile information or interfaces presented by application server 102 in various examples.

A user profile may also include authorization to access other services in which the user has an account. The authorizations may include a token (e.g., using OAuth) or login credentials that authorize application server 102 to retrieve data from the other services in a defined format such as JavaScript Object Notation (JSON) or extensible markup language (XML) over an API. A reciprocal authorization may also be stored in the user profile that authorizes the other services to access data stored in the user profile.

In various examples, data connection management 122 provides a user interface to the user to manage the authorizations. For example, a user may select a service to grant/revoke access.

In various examples, machine learning models 124 may be used to present suggested goals to a user, present personalized content, among other uses. A machine learning model (e.g., neural network, k-nearest neighbor, logistical regression) may be trained using data provided to application server 102 by the user (with authorization given by the user). The training data may include transaction data that indicates a user's frequent shopping locations which may infer the user's interests.

In various examples, goal logic 126 manages goals of the users. A goal may be created by the user or be one suggested according to a machine learning model. A goal may include a target completion data, a target savings amount, a current saved amount, and a title. The goal may be stored as a goal data object in data store 118.

Figure 2A:
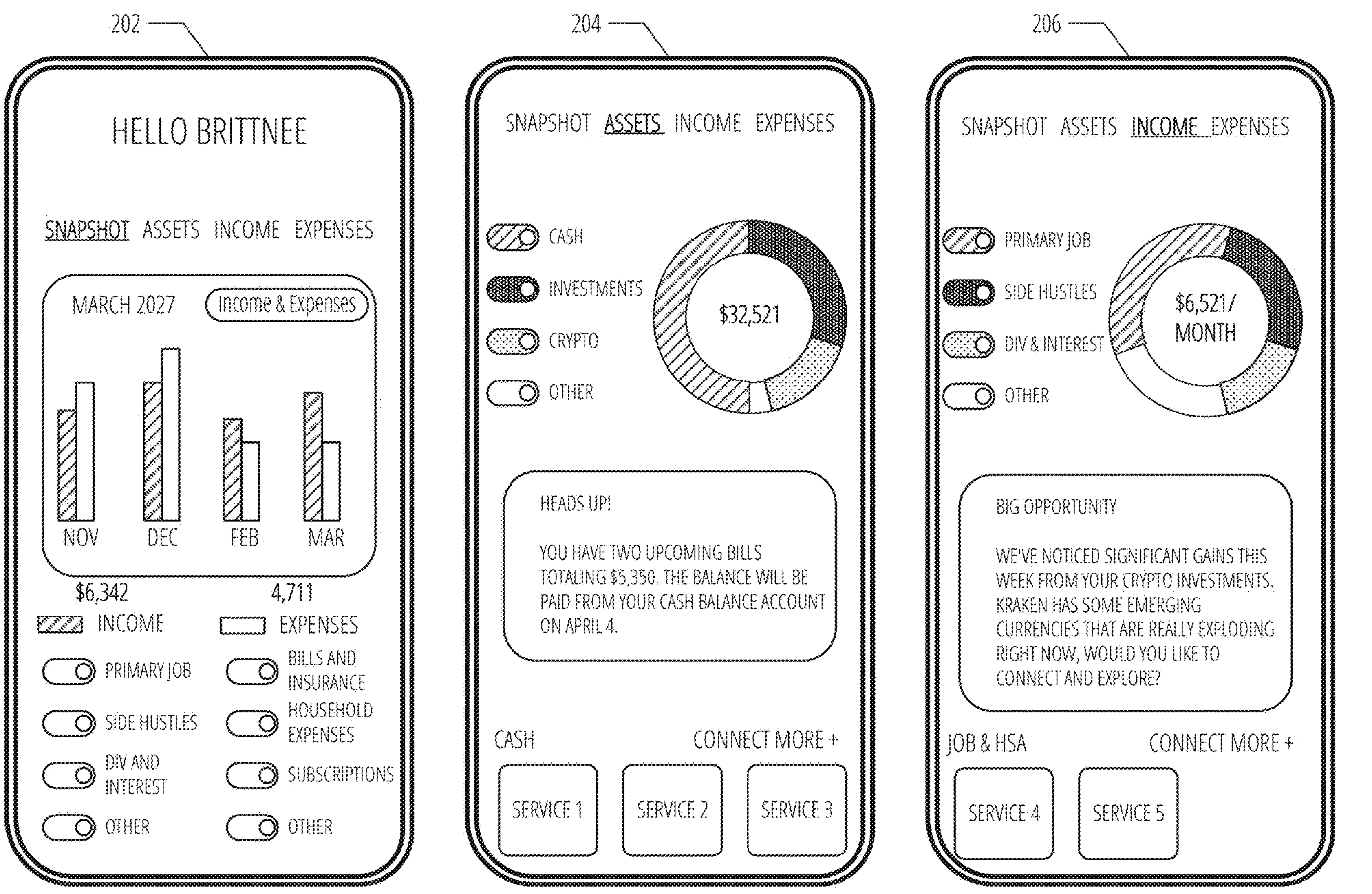
FIG. 2A and FIG. 2B preset a series of user interfaces configured to manage multiple financial accounts, according to various examples.
Figure 2B:
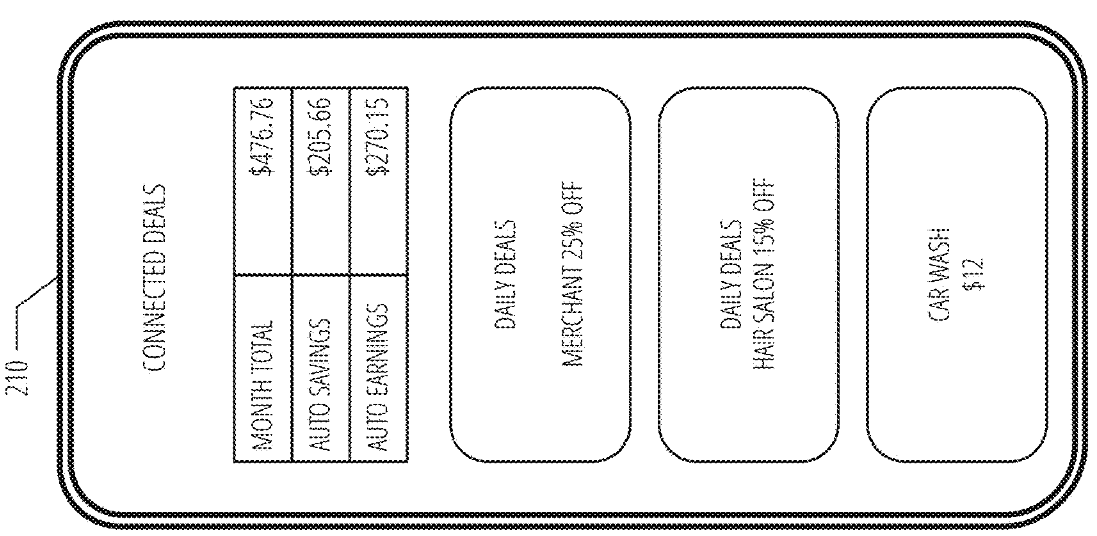
Figure 2B:
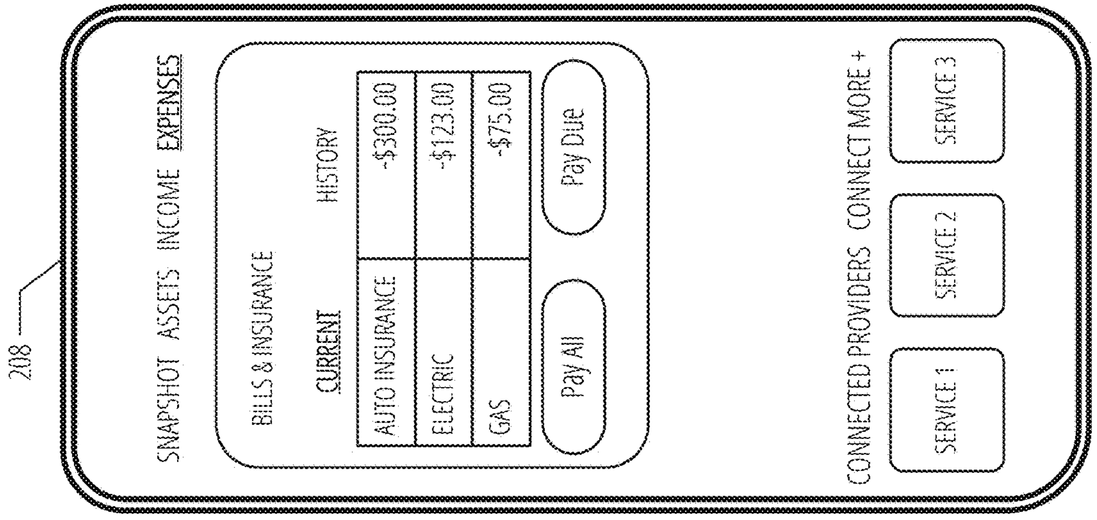

FIG. 2A and FIG. 2B preset a series of user interfaces configured to manage multiple financial accounts, according to various examples. These interfaces, and the subsequent user interface figures, may refer to a running example with a hypothetical person named Brittnee.

Brittnee may, in addition to her day job, work multiple side jobs (e.g., as a driver on a ride services and dog walker) and have a content-creator fund for her growing social media followers. She may have begun to explore emerging financial options, such as crypto, to grow her money. Furthermore, Brittnee may leverage the functionality of application server 102 to integrating discrete financial services/offerings (401K, insurance, healthcare, etc.) and to help manage income and expenses from her gig-economy jobs.

Interface 202 may be a snapshot interface that shows Brittnee her income/expenses from multiple different services she is connected with (e.g., using data connection management 122). The snapshot shows her income and expenses broken down by month and by type.

Interface 204 presents more detailed information on her assets and the breakdown between different asset classes such as cash investments, crypto, and others. Interface 204 further includes a reminder indicating two upcoming bills are how much they are anticipated to cost. Furthermore, options are provided to connect with more services to create a fuller picture of Brittnee's financial health.

Interface 206 presents a more detailed view of her income. As shown, her income is broken down according to her jobs and investments. Additionally, an opportunity in crypto is presented based on her past transactions/investments as determined by machine learning models 124. At the bottom of interface 206 boxes are presented for currently active connections such as ADP for payroll. Similar to interface 204, a link is provided to connect with further income sources.

Interface 208 presents a more detailed view with respect to expenses of Brittnee. The interface includes current bills, anticipated amounts, and due dates as are available. User interface elements may be presented to pay the current expenses that are due or all outstanding bills. Buttons on the bottom of interface 208 indicate current connections, and a link is provided for Brittnee to add more connections.

A user may drill down further into the information on interfaces 204, 206, and 208. For example, on interface 204 the label "investments" may be clicked on, and the user may be presented with a chart indicating all the investment assets for the user. Or, with respect to interface 206, a user may click on "Primary Job" to see how income for that job has changed over time.

Interface 210 presents offers, as determined by machine learning models 124, that may be of interest to Brittnee based on past behavior. The offers may also be based on goals of Brittnee that she has entered into the system as discussed further herein.

Figure 3:
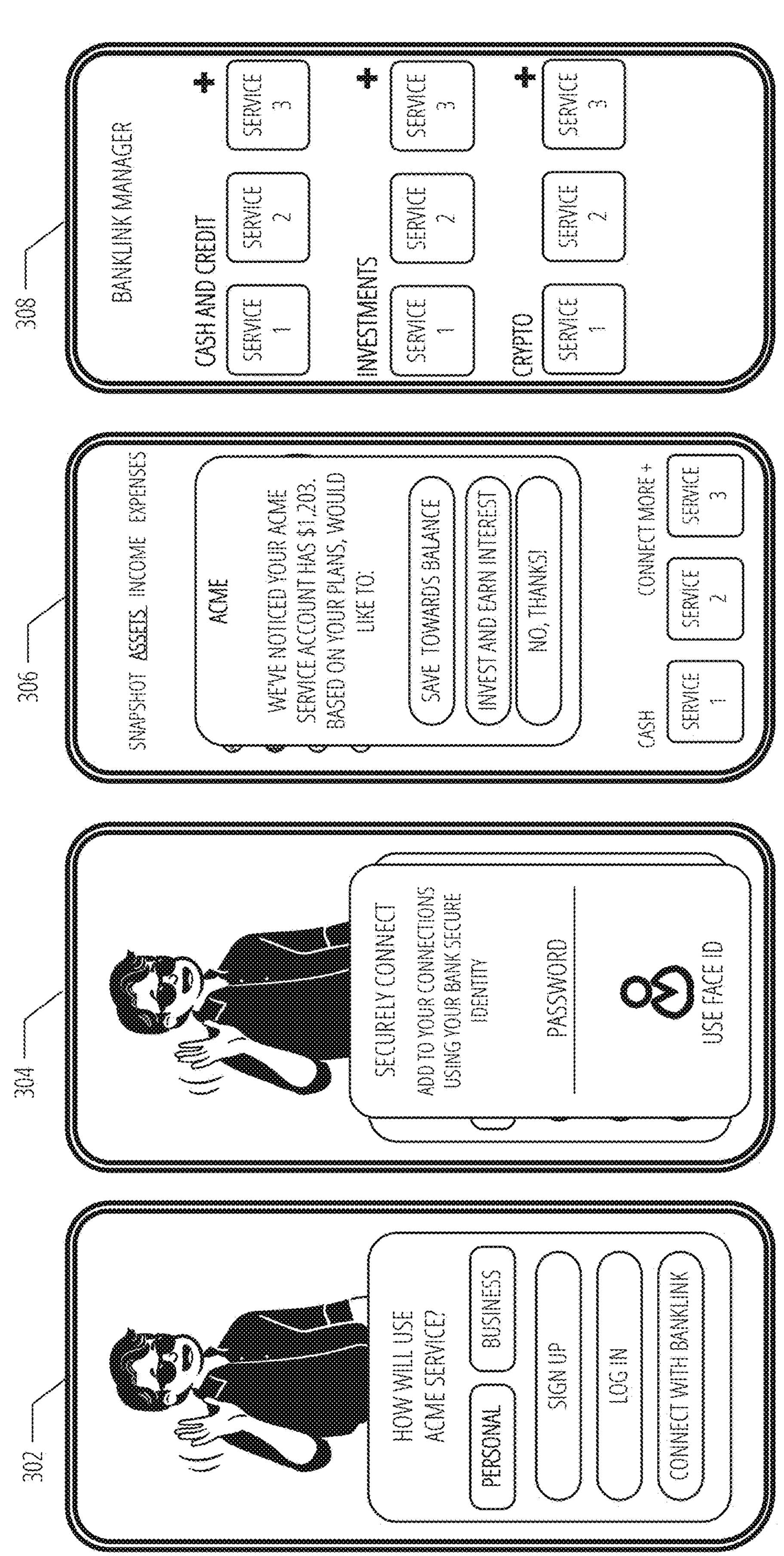
FIG. 3 present a series of user interfaces to manage account connections, according to various examples.

FIG. 3 presents a series of user interfaces to manage account connections, according to various examples. As indicated above, a user may connect with multiple services. This connection may be facilitated at a number of ways. For example, application server 102 may provide a single sign on service (SSO) that permits its users to sign on and authenticate with services outside of application server 102.

Interface 302 presents an interface that allows a user to sign up and connect using "BankLink", which may be a SSO service that permits Brittnee to use her account credentials that she uses with application server 102 to connect with Acme Service. Interface 304 may be a screen that is embedded on Acme Service's website to Brittnee upon selecting "BankLink" interface 302.

Interface 306 may be an interface that is presented and served from application server 102. Because Brittnee has connected Acme Service with application server 102, a recommendation may be presented that is specific to activity on Acme Service. Actionable items are presented to manage the Acme Service account should Brittnee choose to accept one of the offers-standing in contrast to read-only integration services.

Finally, interface 308 presents an overview of connections that Brittnee has made as well as an opportunity to connect more services. In some examples, recommended connections may be made to Brittany based on her past behavior or commonly used services. The recommendations may be categorized according to those presented on interface 308 or other categories as determined by Brittnee.

Figure 4:
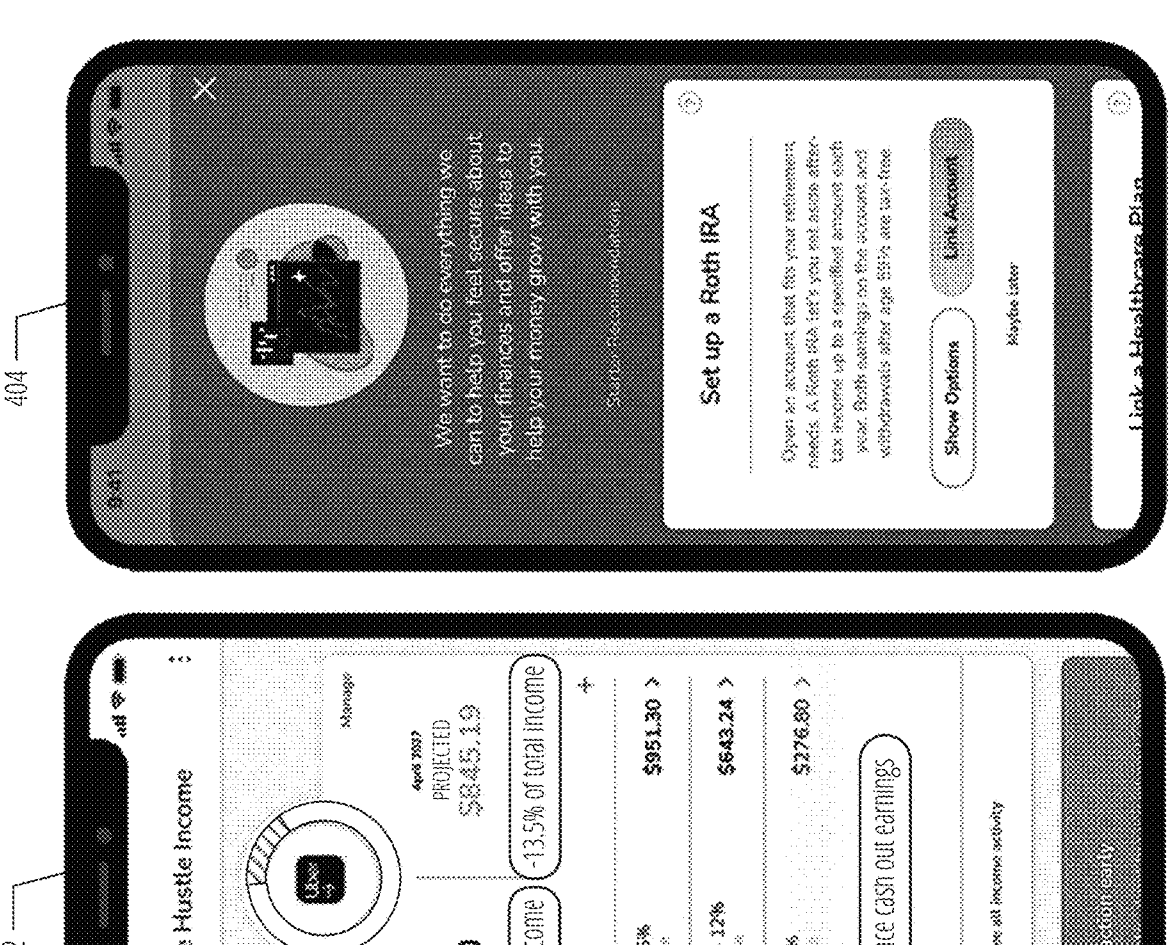
FIG. 4 presents a series of interfaces related to managing fragmented finances, according to various examples.

FIG. 4 presents a series of interfaces related to managing fragmented finances, according to various examples. Due to the prevalence of the gig economy, a user may have multiple sources of income that make it difficult to determine a cohesive retirement strategy given the variability of the income streams. By aggregating all the income into a single view, a user may be able to approximate the feeling of managing income from a single job.

Interface 402 provides a chart with one gig economy job highlighted—e.g., shown as portion of the overall income of the user), as well as a projected income for that job in the upcoming month. The interface further displays what other side job income streams the user has for the current month. An additional function of application server 102 may permit a user to perform an advance cash out with respect to their gig economy jobs due to the knowledge application server 102 has of the user's finances. Interface 404 presents an offer to the user for opening a retirement account as many gig economy workers do not have access to a 401(k). If the user already has an IRA, the user may connect it to their account.

Figure 5:
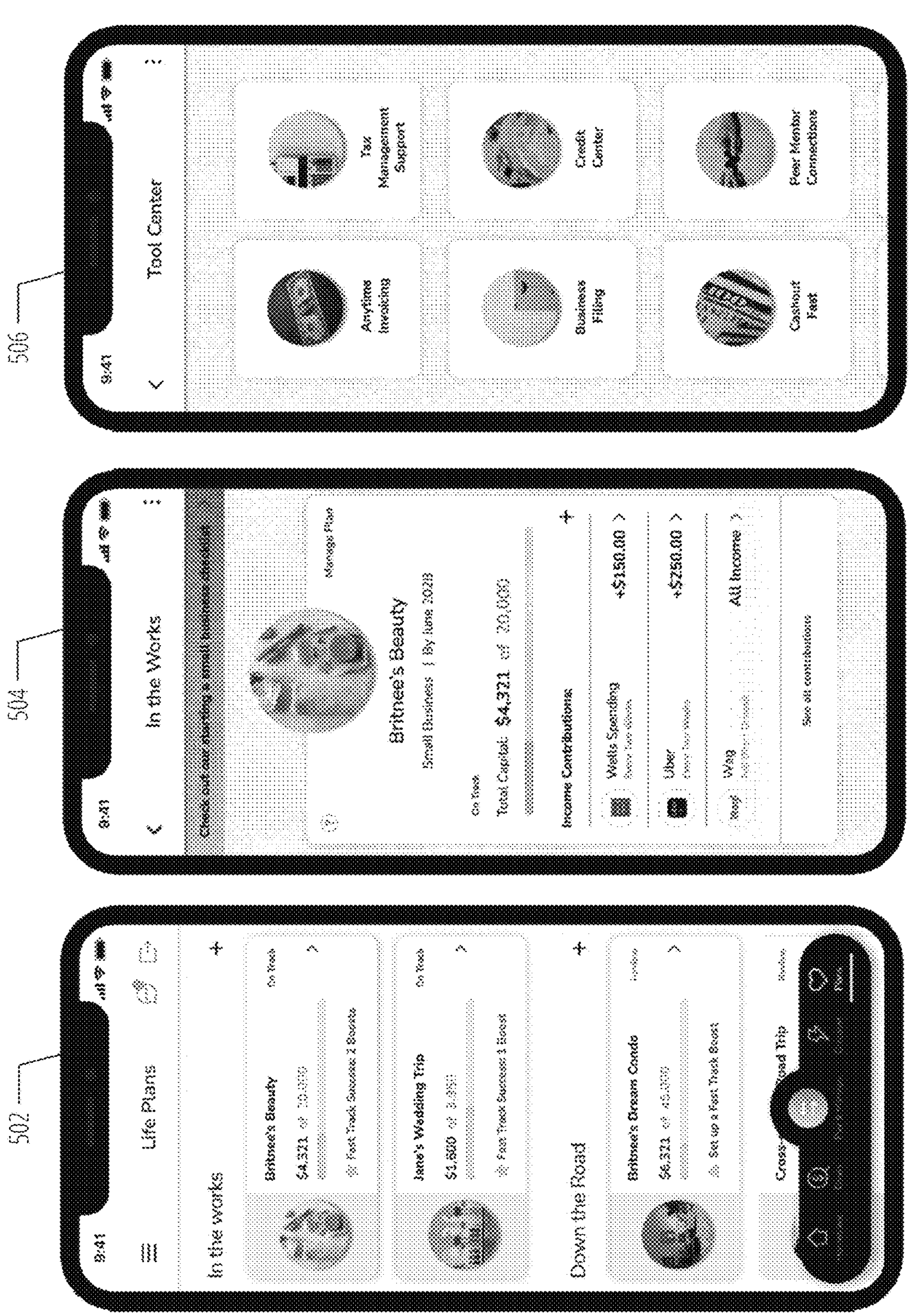
FIG. 5 presents a series of interfaces related to creating and viewing goals, according to various examples.
Figure 6:
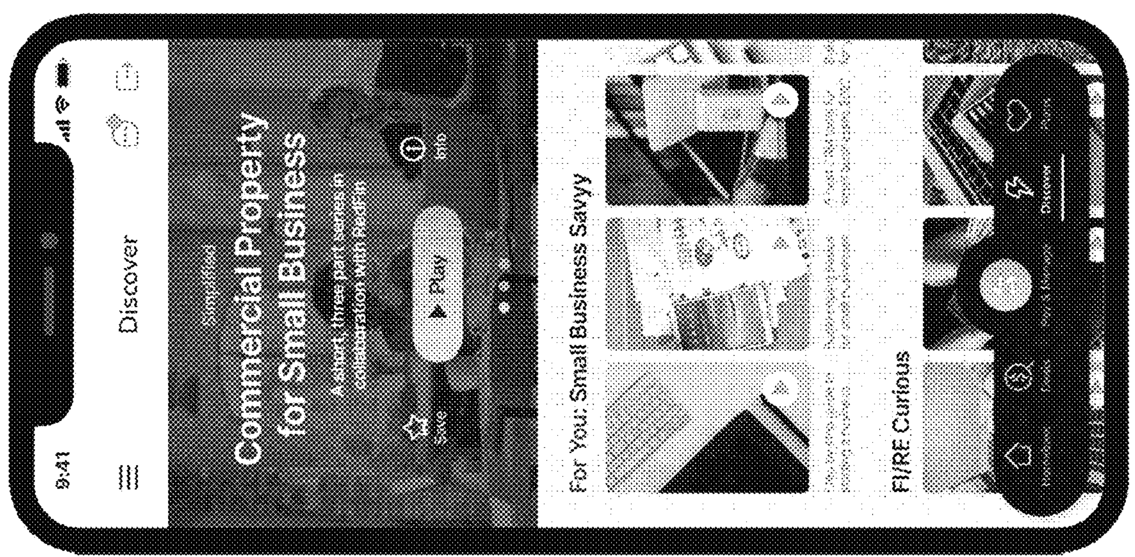
FIG. 6 is a user interface that presents personalized recommendations based on her goals and/or past transactions, according to various examples.

FIG. 5 presents a series of interfaces related to creating and viewing goals, according to various examples. Interface 502 presents an overview of current goals and future looking goals. Interface 504 presents a detailed view of one of the goals. A research tip may be presented related to the goal (e.g., based on keyword matching or a machine learning model). In this case, interface 504 includes a recommendation to view a checklist related to starting a small business. In some examples, a recommendation to add microtasks to the goal may be presented such as buying coffee one less time per week. Interface 506 is dashboard interface that allows a user to research different topics. FIG. 6 is a user interface that presents personalized recommendations based on her goals and/or past transactions.

Figure 7:
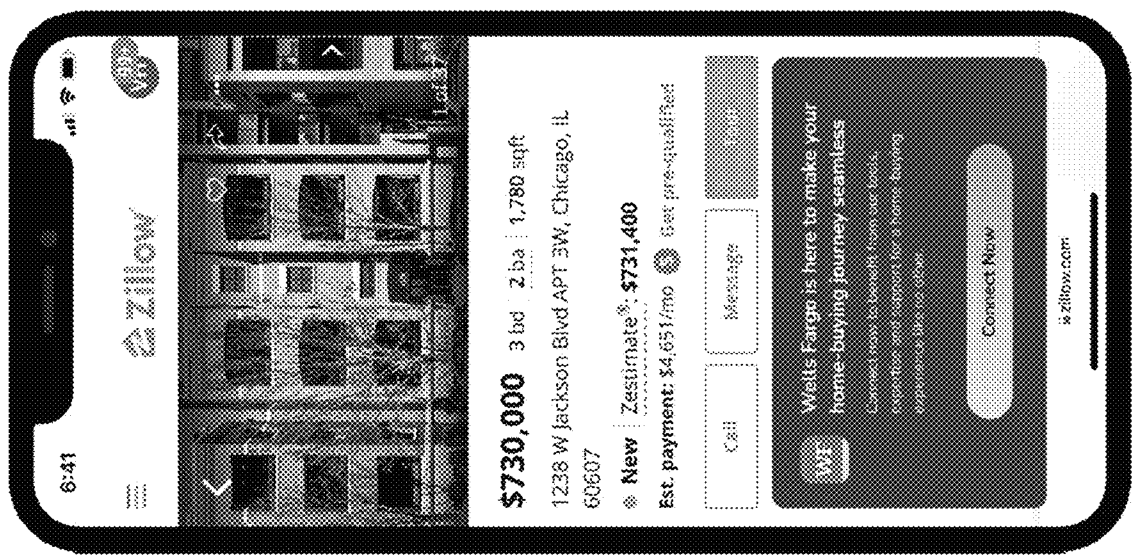
FIG. 7 is a user interface that presents an integration with an external website, according to various examples.

FIG. 7 is a user interface that presents an integration with an external website, according to various examples. In various examples, external sites may leverage data from a user's account within their website. For examples, a house searching website may embed data served from application server 102 upon a user logging in. The embedded data may indicate whether or not a currently viewed home is within a user's pre-approved limit. A user may also apply for a loan using the embedded portion of the webpage. In some examples, financial advice may appear in the embedded portion related to how the purchase may affect their goals.

Figure 8:
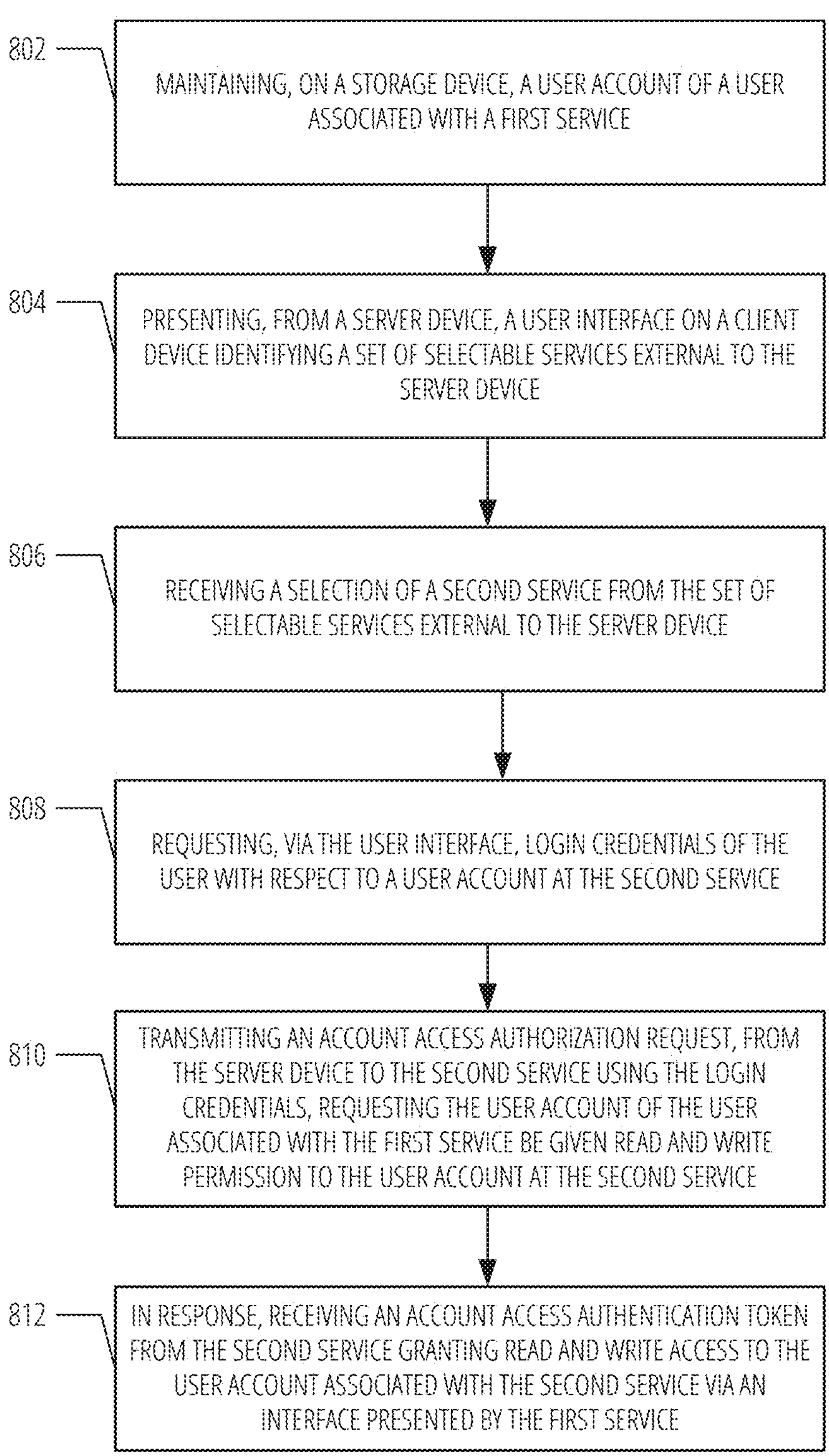
FIG. 8 is a flowchart illustrating operations of a method for receiving an authorization token, according to various examples.

FIG. 8 is a flowchart illustrating operations of a method for receiving an authorization token, according to various examples. The method may be embodied in a set of instructions stored in at least one computer-readable storage device of a computing device(s). A computer-readable storage device excludes transitory signals. In contrast, a signal-bearing medium may include such transitory signals. A machine-readable medium may be a computer-readable storage device or a signal-bearing medium. The computing device(s) may have one or more processors that execute the set of instructions to configure the one or more processors to perform the operations illustrated in FIG. 8. The one or more processors may instruct other component of the computing device(s) to carry out the set of instructions. For example, the computing device may instruct a network device to transmit data to another computing device or the computing device may provide data over a display interface to present a user interface. In some examples, performance of the method may be split across multiple computing devices using a shared computing infrastructure.

In various examples, the method at operation 802, may include maintaining, on a storage device, a user account of a user associated with a first service. The first service may be a financial service offered by a financial institution. The first service may include a checking account and a savings account for example. The user account may be accessible by the user via the first service using either a web application installed on a client device or a web page that includes access to the user account.

Maintaining may mean that after a user account is created, it is stored within a database until such time as the user deletes it and may be updated according to the user or backend processes. Furthermore, the user account may include a user profile that identifies the services that the user is connected with. For example, the user account may be one that is stored in user accounts 120 as discussed above with respect to FIG. 1.

In various examples, the method at operation 804, may include presenting, from a server device, a user interface on a client device, the user interface identifying a set of selectable services external to the server device. The user interface may take a variety of forms depending on the location within a web application user is currently viewing. For example, there may be type specific services related to assets if the user is viewing an asset portion of the user interface as compared to income focused services if the user is on the income tab. An example interface that may include a presentation of existing services, as well as options to add more services, may be found at user interface 308.

In various examples, the method at operation 806, may include receiving a selection of a second service from the set of selectable services external to the server device. Receiving a selection may include a user clicking on an icon that represents the service. For example, the service may be another financial institution or ride sharing service. Other example services are depicted in the user interface as previously discussed.

In various examples, the method at operation 808, may include requesting, via the user interface, login credentials of the user with respect to a user account at the second service. The login credentials with respect to a user account at the second service may differ from those of the first service. The request may be displayed as an overlay interface of the web application, and may in certain examples, be served from the second service itself. Thus, the first service may not have access to the actual login credentials at any time in order to preserve the security and privacy of the user with respect to the second service.

In various examples, the method at operation 810, may include transmitting an account access authorization request, from the server device to the second service using the login credentials, requesting the user account of the user associated with the first service be given read and write permission to the user account at the second service. As discussed in more detail above with respect to data connection management 122, the request may be performed using OAuth in various examples. In various examples, if the user does not currently have an account at the second service, an interface may be presented for the user to create an account with the second service within the displayed interface overlaid on top of the web application of the first service.

In various examples, the method at operation 812, may include and in response to the account access authorization request, receiving an account access authentication token (e.g., a long string of characters such as JSON Web Token (JWT) from the second service. The account access authentication token granting read and write access to the user account associated with the second service via an interface presented by the first service. Accordingly, if the first service wishes to access or modify data of the user account of the second service, the request may be made via an API of the second service using the token as authorization.

The method may also include further includes receiving a request, at the server device, from a third service. The request may be for read access to the user account of the user associated with the first service via an interface presented at the third service. Thus, this may be the reverse communication path as described above with the second service. The read access request may be for a specific piece of information that may be included in the user account of the first service.

For example, in response to the request from the third service, the method may include querying an account balance of the user account of the user associated with the first service. After the querying, the method may include transmitting, from the first service to the third service, web code for embedding in a webpage of the second service that includes including the account balance of the user.

The method may also include receiving data, at the server device, from a third service that identifies a cost of a property being viewed on a webpage of the third service. The data may be accompanied by a request using an authorization token for information related to preapprovals with respect to purchasing a property. In response to the request, the method may include, transmitting from the first service to the third service, web code for embedding in a webpage of the second service, the web code identifying a pre-approval limit for property purchases as stored in the user account of the user associated with the first service.

The method may also include further includes presenting a second user interface including a navigation portion including a plurality of selectable labels including an overview label, an income label, as asset label, and an expense label. The second user interface may further include a content portion configured to display content of the user account of the user associated with the first service based on a selection of a label in the plurality of selectable labels. For example, an interface such as user interface 202 may be presented.

The method may also include further includes receiving a selection of the overview label. The further may also include in response to receiving the selection of the overview label, modifying the content portion to present a plurality of toggles representing income source groupings and expense source groupings, and a chart visualization configured to present a chart based on toggles of the plurality of toggles that are toggled in an on position.

The method may also include further includes receiving a selection of the income label. The further may also include in response to receiving the selection of the income label, modifying the content portion to present a plurality of toggles representing income source groupings in the user account of the user associated with the first service.

The content portion may further include a chart visualization presenting a chart that illustrates proportional representation of each income source grouping in the income source groupings in the user account of the user associated with the first service based on statuses of the plurality of toggles and icon representations of connected services in the set of selectable services external to the server device associated with an income source. For example, an interface such as user interface 206 may be presented.

The method may also include further includes updating the content portion to indicate an income contribution percentage attributable to each respective connected service the connected services shown as an icon representation. For example, an interface such as user interface 402 may be presented.

Figure 9:
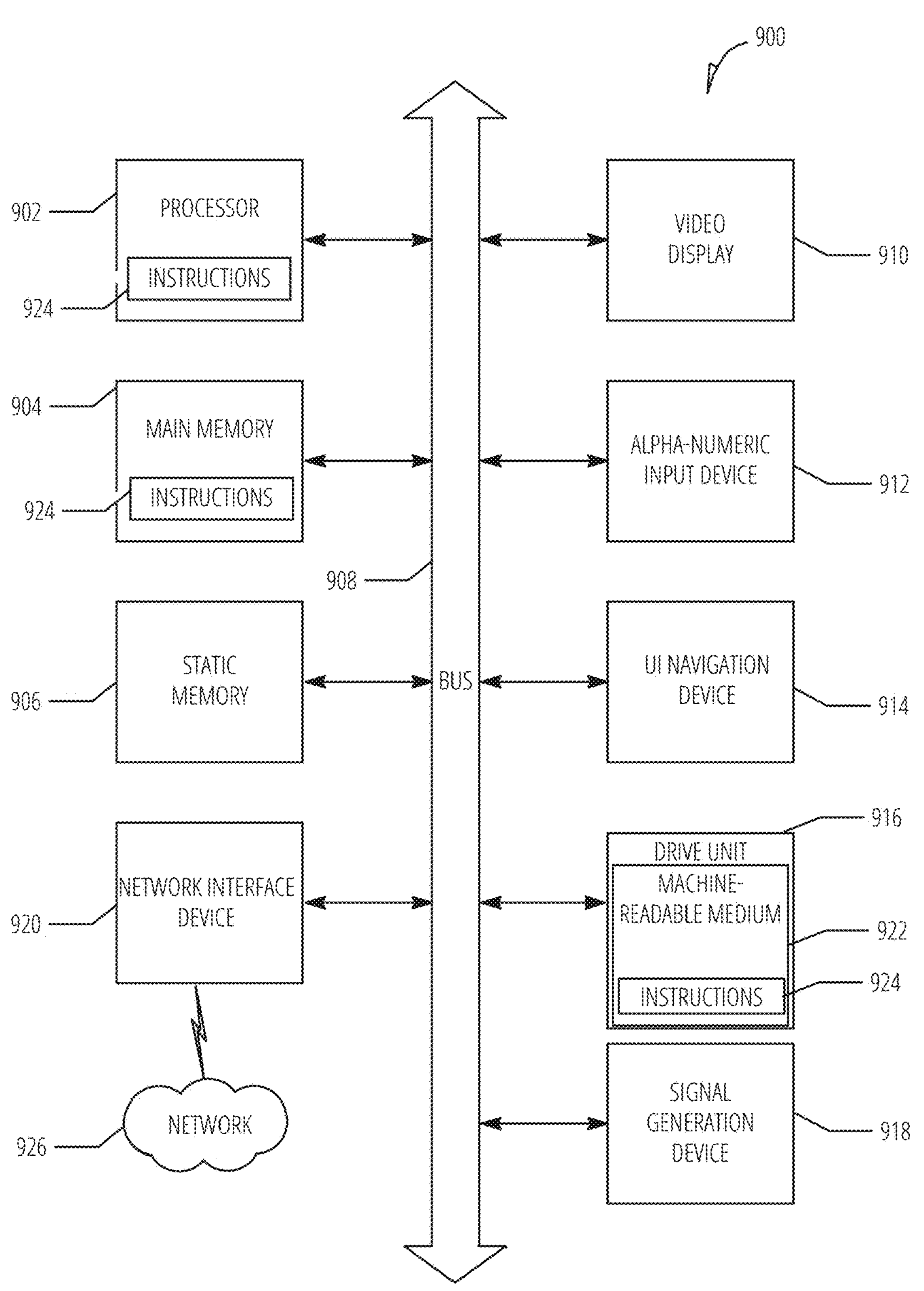
FIG. 9 is a block diagram illustrating an example machine upon which any one or more of the techniques (e.g., methodologies) discussed herein may be performed, according to an example embodiment.

FIG. 9 is a block diagram illustrating a machine in the example form of a computer system 900, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be an onboard vehicle system, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 900 includes at least one processor 902 (e.g., a central processing unit (CPU), a graphics processing unit (GPU) or both, processor cores, compute nodes, etc.), a main memory 904 and a static memory 906, which communicate with each other via a link 908 (e.g., bus). The computer system 900 may further include a video display unit 910, an input device 912 (e.g., a keyboard), and a user interface (UI) navigation device 914 (e.g., a mouse). In one embodiment, the video display unit 910, input device 912 and UI navigation device 914 are incorporated into a touch screen display. The computer system 900 may additionally include a storage device 916 (e.g., a drive unit), a signal generation device 918 (e.g., a speaker), a network interface device 920, and one or more sensors (not shown), such as a global positioning system (GPS) sensor, compass, accelerometer, or other sensor.

The storage device 916 includes a machine-readable medium 922 on which is stored one or more sets of data structures and instructions 924 (e.g., software) embodying or utilized by any one or more of the methodologies or functions described herein. The instructions 924 may also reside, completely or at least partially, within the main memory 904, static memory 906, and/or within the processor 902 during execution thereof by the computer system 900, with the main memory 904, static memory 906, and the at least one processor 902 also constituting machine-readable media.

While the machine-readable medium 922 is illustrated in an example embodiment to be a single medium, the term "machine-readable medium" may include a single medium or multiple media (e.g., a centralized or distributed database, and/or associated caches and servers) that store the instructions 924. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 924 may further be transmitted or received over a communications network 926 using a transmission medium via the network interface device 920 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 3G, 4G LTE/LTE-A or WiMAX networks, and 5G). The term “transmission medium” shall be taken to include any intangible medium that is capable of storing, encoding, or carrying instructions for execution by the machine, and includes digital or analog communications signals or other intangible medium to facilitate communication of such software.

The above detailed description includes references to the accompanying drawings, which form a part of the detailed description. The drawings show, by way of illustration, specific embodiments that may be practiced. These embodiments are also referred to herein as “examples.” Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

What is claimed is:

1. A method comprising:

maintaining, on a storage device, a user account of a user associated with a first service;

presenting, from a server device, a user interface on a client device, the user interface identifying a set of selectable services external to the server device, the set of selectable services including financial and non-financial services;

receiving a selection of a second service from the set of selectable services external to the server device;

requesting, via the user interface, login credentials of the user with respect to a user account at the second service;

transmitting an account access authorization request, from the server device to the second service using the login credentials, requesting the user account of the user associated with the first service be given read and write permission to the user account at the second service;

in response to the account access authorization request, receiving an account access authentication token from the second service, the account access authentication token granting read and write access to the user account associated with the second service via an interface presented by the first service;

receiving data, at the server device, from a third service, identifying a cost of a property being viewed on a webpage of the third service; and transmitting, from the first service to the third service, web code for embedding in a webpage of the third service, wherein the web code;

identifies a pre-approval limit for property purchases as stored in the user account of the user associated with the first service;

includes an option to initiate a loan application with the first service; and is configured to be displayed in an embedded portion of the webpage of the third service, the embedded portion being visually distinct from other content of the webpage of the third service.

2. The method of claim 1, wherein the web code is configured to display a visual indicator on the webpage indicating whether the cost of the property is within the pre-approval limit.

3. The method of claim 1, wherein the web code is configured to display an option to connect the third service to the first service.

4. A non-transitory computer-readable medium comprising instructions, which when executed by a processing unit configure the processing unit to perform operations comprising:

maintaining, on a storage device, a user account of a user associated with a first service;

presenting, from a server device, a user interface on a client device, the user interface identifying a set of selectable services external to the server device, the set of selectable services including financial and non-financial services;

receiving a selection of a second service from the set of selectable services external to the server device;

requesting, via the user interface, login credentials of the user with respect to a user account at the second service;

transmitting an account access authorization request, from the server device to the second service using the login credentials, requesting the user account of the user associated with the first service be given read and write permission to the user account at the second service;

in response to the account access authorization request, receiving an account access authentication token from the second service, the account access authentication token granting read and write access to the user account associated with the second service via an interface presented by the first service;

receiving data, at the server device, from a third service, identifying a cost of a property being viewed on a webpage of the third service; and transmitting, from the first service to the third service, web code for embedding in a webpage of the third service, wherein the web code:

identifies a pre-approval limit for property purchases as stored in the user account of the user associated with the first service;

includes an option to initiate a loan application with the first service; and is configured to be displayed in an embedded portion of the webpage of the third service, the embedded portion being visually distinct from other content of the webpage of the third service.

5. The non-transitory computer-readable medium of claim 4, wherein the web code is configured to display a visual indicator on the webpage indicating whether the cost of the property is within the pre-approval limit.

6. The non-transitory computer-readable medium of claim 4, wherein the web code is configured to display an option to connect the third service to the first service.

7. A system comprising:

a processing unit; and a storage device comprising instructions, which when executed by the processing unit, configure the processing unit to perform operations comprising:

maintaining a user account of a user associated with a first service;

presenting, from a server device, a user interface on a client device, the user interface identifying a set of selectable services external to the server device, the set of selectable services including financial and non-financial services;

receiving a selection of a second service from the set of selectable services external to the server device;

requesting, via the user interface, login credentials of the user with respect to a user account at the second service;

transmitting an account access authorization request, from the server device to the second service using the login credentials, requesting the user account of the user associated with the first service be given read and write permission to the user account at the second service;

in response to the account access authorization request, receiving an account access authentication token from the second service, the account access authentication token granting read and write access to the user account associated with the second service via an interface presented by the first service;

receiving data, at the server device, from a third service, identifying a cost of a property being viewed on a webpage of the third service; and transmitting, from the first service to the third service, web code for embedding in a webpage of the third service, wherein the web code:

identifies a pre-approval limit for property purchases as stored in the user account of the user associated with the first service;

includes an option to initiate a loan application with the first service; and is configured to be displayed in an embedded portion of the webpage of the third service, the embedded portion being visually distinct from other content of the webpage of the third service.

8. The system of claim 7, wherein the web code is configured to display a visual indicator on the webpage indicating whether the cost of the property is within the pre-approval limit.

9. The system of claim 7, wherein the web code is configured to display an option to connect the third service to the first service.

* * * * *